(12) United States Patent
Cree et al.

(10) Patent No.: US 8,525,028 B2
(45) Date of Patent: Sep. 3, 2013

(54) THERMOPLASTIC HALOGEN-FREE FLAME RETARDANT FORMULATIONS

(75) Inventors: Stephen H. Cree, Hirzel (CH); Gerrit Groot-Enzerink, Gross (CH)

(73) Assignee: Dow Global Technologies LLC, Midland, MI (US)

( * ) Notice: Subject to any disclaimer, the term of this patent is extended or adjusted under 35 U.S.C. 154(b) by 297 days.

(21) Appl. No.: 12/811,965

(22) PCT Filed: Jan. 29, 2009

(86) PCT No.: PCT/US2009/032410
§ 371 (c)(1),
(2), (4) Date: Jul. 7, 2010

(87) PCT Pub. No.: WO2009/097410
PCT Pub. Date: Aug. 6, 2009

(65) Prior Publication Data
US 2010/0282489 A1 Nov. 11, 2010

Related U.S. Application Data

(60) Provisional application No. 61/024,712, filed on Jan. 30, 2008.

(51) Int. Cl.
*H01B 7/00* (2006.01)

(52) U.S. Cl.
USPC .............. 174/110 R; 174/120 R; 174/121 R; 174/121 A

(58) Field of Classification Search
USPC ................. 174/102 R, 102 SC, 103, 110 R, 174/110 N–110 PM, 120 R, 120 SC, 121 A; 525/71, 74, 77, 78, 80, 194, 285, 232, 240; 428/372, 375, 379, 383
See application file for complete search history.

(56) References Cited

U.S. PATENT DOCUMENTS

| | | | |
|---|---|---|---|
| 4,983,742 A | | 1/1991 | Yusawa et al. |
| 5,317,051 A | | 5/1994 | Harashige et al. |
| 5,698,323 A | | 12/1997 | Keough et al. |
| 5,726,231 A | | 3/1998 | Namiki et al. |
| 5,948,860 A | * | 9/1999 | Hiraoka et al. ................. 525/74 |
| 6,034,162 A | | 3/2000 | Mizutani et al. |
| 6,143,816 A | | 11/2000 | Prescher et al. |
| 6,232,377 B1 | | 5/2001 | Hayashi et al. |
| 6,372,344 B1 | * | 4/2002 | Castellani et al. ............ 428/379 |
| 6,410,651 B1 | * | 6/2002 | Castellani et al. ............ 525/232 |
| 6,476,138 B2 | | 11/2002 | Sato et al. |
| 6,492,453 B1 | | 12/2002 | Ebrahimian et al. |
| 6,552,112 B1 | * | 4/2003 | Redondo et al. ............... 524/436 |
| 6,753,372 B1 | | 6/2004 | Garcia Duran et al. |
| 6,756,447 B2 | * | 6/2004 | Castellani et al. ............ 525/232 |
| 6,924,031 B2 | | 8/2005 | Grizante Redondo et al. |
| 7,026,404 B2 | | 4/2006 | Cozewith et al. |
| 7,144,941 B2 | | 12/2006 | Sauerwein et al. |
| 2003/0225198 A1 | | 12/2003 | Arbues |
| 2010/0282489 A1 | * | 11/2010 | Cree et al. ............... 174/110 SR |

FOREIGN PATENT DOCUMENTS

| | | |
|---|---|---|
| CA | 2350293 A1 | 12/2001 |
| EP | 0530940 A1 | 3/1993 |
| EP | 0656390 A1 | 6/1995 |
| EP | 0998747 A1 | 5/2000 |
| EP | 1213324 A1 | 6/2002 |
| EP | 1221464 A1 | 7/2002 |
| EP | 1288259 A1 | 3/2003 |
| JP | EP 1213324 A * | 1/2001 |
| WO | WO-2004099309 A1 | 11/2004 |

* cited by examiner

*Primary Examiner* — William H Mayo, III

(57) ABSTRACT

Highly-mineral-filled, halogen-free, flame-retardant compositions made from or containing a polypropylene thermoplastic elastomer, a polypropylene, a metal hydroxide filler, and a polar-monomer-grafted polyolefin elastomer compatibilizer. Such compositions can be employed in preparing various articles of manufacture, including extruded articles and coated conductors, such as cables.

15 Claims, No Drawings

THERMOPLASTIC HALOGEN-FREE FLAME RETARDANT FORMULATIONS

FIELD

This invention relates to flame retardant formulations for cable application. Specifically, it relates to thermoplastic halogen-free flame retardant formulations for insulating or sheathing electrical cables, extruded sheeting, or extruded profiles.

INTRODUCTION

Notably, cable manufacturers must evaluate a range of properties when selecting a product as an insulating or cable sheathing material. Properties include electrical performance, mechanical properties (e.g., tensile and flexural behavior), and overall system cost.

Another key parameter in the selection process is the fire safety of the cable, particularly the flame retardancy of the insulation or the jacketing material. Flame retardancy can be achieved in a number of ways. One possibility is the addition of hydrated fillers, which dilute the concentration of flammable material and decompose below the ignition temperature of the polymer when exposed to heat, releasing water and removing heat from the fire source.

However, the use of hydrated mineral fillers in polyolefin wire and cable formulations suffers from a number of drawbacks. The majority of the drawbacks stem from the very high incorporation level of filler necessary to meet fire retardant specifications. To achieve any worthwhile level of fire performance, filler loadings of up to 60-65 weight in polyolefins are not uncommon. This level of filler has a drastic effect on polymer properties and leads to compounds with a high density and limited flexibility in addition to low mechanical properties, especially elongation at break.

Further many specifications call for a particular performance in the "hot pressure" or "hot knife" test. In the hot knife test or hot pressure test, a knife is placed on the sample under a specific weight at a specific temperature for specific time. Test temperature is generally 90 degrees Celsius or even higher, with the lower the permanent degree of penetration the better.

Further, in order to enhance the mechanical properties of a polyolefin-hydrated mineral filled compound, some form of compatibilization is also needed between the basic polar filler surface and the inert polyolefin matrix. Filler suppliers have tackled this problem by supplying their fillers coated with carefully selected additives; however, an alternative procedure is to use small amounts of maleic anhydride grafted polymers.

Therefore, there is a need for an improved halogen-free flame retardant ("HFFR") system with improved tensile strength, improved elongation at break, and low permanent deformation at increasingly high test temperatures.

SUMMARY

To that end, the presently invented highly mineral filled HFFR composition is provided. It comprises a polypropylene, a thermoplastic propylene/ethylene copolymer elastomer, a polar-monomer-grafted polyolefin elastomer compatibilizer, and a metal hydroxide filler. Specifically, the present invention achieves a tensile strength greater than 10 MPa, an elongation at break greater than 100%, and less than 2% residual deformation when subjected to the hot pressure test at 90 degrees Celsius. Additionally, the present invention yields desirable flexibility and hardness (about 60 Shore D).

DETAILED DESCRIPTION

The composition of the present invention is useful in all applications where an improved flexibility flame retardant polyolefin composition having deformation resistance at greater than 90 degrees Celsius is required. Suitable examples include wire and cable insulation and/or sheathing as well as extruded sheeting and profiles.

"Polypropylene" means a propylene homopolymer, propylene random copolymer, a propylene copolymer, or a propylene impact polymer composition. Preferably, the polypropylene is a propylene homopolymers. However, the polypropylene can be a propylene copolymer comprising a propylene/alpha-olefin copolymer, which is typically comprised of units derived from propylene in an amount of at least 60 percent by weight of the copolymer. For propylene/ethylene copolymers, the unit derived from propylene preferably comprise at least about 80, and more preferably at least about 85, percent by weight of the copolymer.

The polypropylene should be present in the range of about 10-20 weight percent. More preferably, it should be present in amount of about 15 weight percent.

Thermoplastic propylene/ethylene copolymer elastomer is composed of a majority of propylene with a minor amount of ethylene. Preferably, it has an ethylene content of greater than about 10 percent.

These polymer compositions include a linear, single homogeneous macromolecular copolymer structure. These polymers have limited crystallinity due to adjacent isotactic propylene units. They are generally devoid of any substantial intermolecular heterogeneity in tacticity and comonomer composition, and are substantially free of diene. They are also devoid of any substantial heterogeneity in intramolecular composition distribution. These thermoplastic polymers are elastic.

The thermoplastic propylene/ethylene copolymer elastomer should be present in the range of about 15-35 weight percent. More preferably, it should be present in amount of about 20 weight percent.

Suitable examples of thermoplastic propylene/ethylene copolymer elastomers for use in the present invention include the VERSIFY™ elastomer family of products available from The Dow Chemical Company.

The polar-monomer-grafted polyolefin elastomer is suitably prepared by grafting one or more functional groups onto polyolefin. Suitable polar monomers include silanes and maleic anhydride. The amount of polar monomer used can vary depending upon the nature of the polyolefin and the desired application. Suitable examples of maleic-anhydride grafted polyolefin elastomer compatibilizer include AMPLIFY™ GR functional polymers available from The Dow Chemical Company and FUSABOND™ modified polymers available from E.I. du Pont de Nemours and Company.

As used herein, a compatibilizer is a component added to a blend of two or more immiscible polymers having poor mechanical properties because the interactions between the polymers are too low. An efficient compatibilizer has the same affinity for each of the polymers and permits the blends to form a stable blend, thereby improving the mechanical properties.

The polar-monomer-grafted polyolefin elastomer compatibilizer should be present in the range of about 2.5-7.5 weight percent. More preferably, it should be present in amount of about 5 weight percent. Preferably, the polar monomer is maleic anhydride. Other compatibilizers may be used in addition to the preferred maleic anhydride grafted polyolefin or as a replacement thereto. Those compatibilizers include alkoxy silane coupling agents and maleic anhydride coupling agents.

Alternatively, the polar-monomer-grafted polyolefin elastomer compatibilizer may be created in situ and may be a grafted polypropylene thermoplastic elastomer. Further, such a system can include azide additives to regulate the radical grafting process. It is believed that selection of a grafted polypropylene thermoplastic elastomer having its base polymer as the same polymer as the polypropylene thermoplastic elastomer will yield a more optimally compatibilized composition.

The metal hydroxide filler should be present in an amount greater than about 45 weight percent. Preferably, it should be present in the range of about 50-70 weight percent. Even more preferably, the mineral filler should be present in an amount of about 60 weight percent. Most preferably, the mineral filler should be magnesium hydroxide.

The composition may further comprise a polar copolymer such as ethylene/vinyl acetate copolymer or an ethylene/acrylate copolymer. It is believed that the polar copolymer will facilitate improved drip performance during flame testing.

The polypropylene and a thermoplastic propylene/ethylene copolymer elastomer are susceptible to chain scission that could deteriorate physical properties. To overcome, chain scission and its related deterioration of properties, it may suitable to incorporate hindered amine-derived stable organic free radicals include 2,2,6,6,-tetramethyl piperidinyl oxy (TEMPO) and its derivatives in the composition. More preferably, hindered amine-derived stable organic free radicals are bis-TEMPOs, oxo-TEMPO, 4-hydroxy-TEMPO, an ester of 4-hydroxy-TEMPO, polymer-bound TEMPO, PROXYL, DOXYL, di-tertiary butyl N oxyl, dimethyl diphenylpyrrolidine-1-oxyl, 4 phosphonoxy TEMPO, or a metal complex with TEMPO. Even more preferably, hindered amine-derived stable organic free radical is a bis-TEMPO or 4-hydroxy-TEMPO. An example of a bis-TEMPO is bis(1-oxyl-2,2,6,6-tetramethylpiperidine-4-yl)sebacate.

EXAMPLES

The following non-limiting examples illustrate the invention.

Addition of Polymeric Compatibilizer

On the Haake mixer, blend the components at 190 degrees Celsius and 50 to 75 rpm. Keep temperature below 210 degrees Celsius as the mineral filler will start to decompose. Add polymer first then compatibilizer. Finally, add the hydrated mineral filler in small amounts and mix final compound at 75 rpm until the torque is level and a good blend is achieved, but keep temperature below about 200 degrees Celsius.

Compression mold plate: Conditions: 4 minutes preheat at 10 Bar and 160 degrees Celsius then 3 minutes at 100 Bar and 180 degrees Celsius. Cool using ISO program with fixed cooling rate.

Testing

Measure:
(1) Shore D
(2) Melt Index 21.6 at 190 degrees Celsius
(3) Tensile strength
(4) Elongation at break
(5) Hot deformation at 90 degrees Celsius; 1 hr; 220 g
(6) Flexural modulus The test specimens were prepared using the following components:
(1) ENGAGE™ 8100 ethylene/octane polyolefin elastomer, having a density of 0.870 g/cm and a melt index of 1 dg/m measured at 190 degrees Celsius and 2.16 kg, available from The Dow Chemical Company;
(2) ENGAGE™ 7256 ethylene/butene polyolefin elastomer, having a density of 0.885 g/cm and a melt index of 2 dg/m measured at 190 degrees Celsius and 2.16 kg, available from The Dow Chemical Company;
(3) VERSIFY™ 3300 polypropylene elastomer, having a density of 0.866 g/cm and a melt flow rate of 8 g/10 min measured at 230 degrees Celsius and 2.16 kg, available from The Dow Chemical Company;
(4) FUSABOND™ 494D maleic-anhydride grafted compatibilizer, available from E.I. du Pont de Nemours and Company;
(5) FUSABOND™ 226D maleic anhydride grafted ethylene-based compatibilizer, having a melt flow rate of 1.5 g/10 measured at 190 degrees Celsius and 2.16 kg, available from E.I. du Pont de Nemours and Company;
(6) MAGNIFIN™ H5 magnesium hydroxide, having a moisture content less than 0.3 weight percent, a specific surface area (BET) of 4.0 to 6.0 $m^2/g$, and a density of 2.4 $g/cm^3$, available form Albemarle Corporation; and
(7) APRYL™ 40CD aluminum hydroxide, having a moisture content of about 0.2 weight percent, a specific surface area (BET) of 3.5 $m^2/g$, and a density of 2.4 $g/cm^3$, available from Nabaltec AG.

Table 1 shows four comparative examples (Comp. Ex. 1-4) and an example of the present invention (Example 5) of the present invention. Each amount is shown in weight percent.

Comparative Example 1 shows the inability of a highly crystalline polyolefin to meet elongation at break, hardness, and flexibility targets. Comparative Example 2 shows the difficulty of a softer, flexible compound in resisting deformation in a hot pressure test.

Comparative Example 3 shows limited mechanical properties (low elongation at break) and significant permanent deformation. Comparative Example 4 results in having hardness and flexural modulus that are too high and elongations at break are <100%.

| Component | Comp. Ex. 1 | Comp. Ex. 2 | Comp. Ex. 3 | Comp. Ex. 4 | Example 5 |
|---|---|---|---|---|---|
| 25 MFR polypropylene | 35 | | 14 | 14 | 14 |
| ENGAGE ™ 8100 | | | 21 | | |
| ENGAGE ™ 7256 | | 30 | | | |
| VERSIFY ™ DE3300 | | | | 21 | 21 |
| FUSABOND ™ 494D | 5 | 5 | 5 | | 5 |
| FUSABOND ™ 226D | | | | 5 | |

-continued

| Component | Comp. Ex. 1 | Comp. Ex. 2 | Comp. Ex. 3 | Comp. Ex. 4 | Example 5 |
|---|---|---|---|---|---|
| MAGNIFIN ™ H5 | 60 | | 60 | 60 | 60 |
| APRYAL ™ 40CD | | 65 | | | |
| Properties | | | | | |
| Melt Flow | 64 | 8 (160C.) | 14 | 30 | 33 |
| Shore D | 78 | 47 | 58 | 67 | 60 |
| Tensile Strength | 20.5 | 9.7 | 10.5 | 12.5 | 12.2 |
| Elongation at Break | 15 | 240 | 80 | 90 | 120 |
| Hot Deformation | 0 | 100 | 15 | 1 | 2 |
| Flexural Modulus | 740 | 90 | 225 | 480 | 270 |

What is claimed is:

1. A halogen-free, flame-retardant composition comprising:
   (a) a propylene polymer;
   (b) a thermoplastic propylene/ethylene copolymer elastomer;
   (c) a polar-monomer grafted polyolefinic elastomer compatibilizer; and
   (d) a metal hydroxide filler,
   wherein said thermoplastic propylene/ethylene copolymer elastomer is composed of a majority of propylene with a minor amount of ethylene.

2. The halogen-free, flame-retardant composition of claim 1 wherein
   (a) the propylene polymer is present in an amount between about 10 to about 20 weight percent;
   (b) the thermoplastic propylene/ethylene copolymer elastomer is present in an amount between about 15 to about 35 weight percent;
   (c) the polar-monomer grafted polyolefinic elastomer compatibilizer is present in an amount between about 2.5 to about 7.5 weight percent; and
   (d) the metal hydroxide filler is present in an amount greater than about 45 weight percent.

3. The halogen-free, flame-retardant composition of claim 1 or claim 2 wherein the polar-monomer grafted polyolefinic elastomer compatibilizer is a maleic-anhydride grafted polyolefin elastomer.

4. The halogen-free, flame-retardant composition of claim 1 or claim 2 wherein the metal hydroxide filler is magnesium hydroxide.

5. A cable comprising one or more electrical conductors or a core of one or more electrical conductors, each conductor or core being surrounded by a halogen-free, flame retardant layer comprising the halogen-free, flame-retardant composition according to claim 1.

6. An extruded article comprising the halogen-free, flame-retardant composition according to claim 1.

7. The halogen-free, flame-retardant composition of claim 1, wherein said thermoplastic propylene/ethylene copolymer elastomer has an ethylene content of greater than 10 percent and less than 50 percent.

8. The halogen-free, flame-retardant composition of claim 1, wherein said polar-monomer grafted polyolefinic elastomer compatibilizer consists of a maleic-anhydride-grafted polyolefin.

9. The halogen-free, flame-retardant composition of claim 1, wherein said thermoplastic propylene/ethylene copolymer elastomer has a linear, single homogeneous macromolecular copolymer structure, wherein said thermoplastic propylene/ethylene copolymer elastomer is substantially devoid of intermolecular heterogeneity in tacticity and comonomer composition, wherein said thermoplastic propylene/ethylene copolymer elastomer is substantially free of diene, wherein said thermoplastic propylene/ethylene copolymer elastomer is substantially devoid of heterogeneity in intramolecular composition distribution.

10. A halogen-free, flame-retardant composition comprising:
    (a) a propylene polymer;
    (b) a thermoplastic propylene/ethylene copolymer elastomer;
    (c) an organic peroxide;
    (d) a polar graftable monomer; and
    (e) a metal hydroxide filler,
    wherein said thermoplastic propylene/ethylene copolymer elastomer is composed of a majority of propylene with a minor amount of ethylene.

11. A cable comprising one or more electrical conductors or a core of one or more electrical conductors, each conductor or core being surrounded by a halogen-free, flame retardant layer comprising the halogen-free, flame-retardant composition according to claim 10.

12. An extruded article comprising the halogen-free, flame-retardant composition according to claim 10.

13. The halogen-free, flame-retardant composition of claim 10, wherein said thermoplastic propylene/ethylene copolymer elastomer has an ethylene content of greater than 10 percent and less than 50 percent.

14. The halogen-free, flame-retardant composition of claim 10, wherein said polar graftable monomer consists of maleic anhydride.

15. The halogen-free, flame-retardant composition of claim 10, wherein said thermoplastic propylene/ethylene copolymer elastomer has a linear, single homogeneous macromolecular copolymer structure, wherein said thermoplastic propylene/ethylene copolymer elastomer is substantially devoid of intermolecular heterogeneity in tacticity and comonomer composition, wherein said thermoplastic propylene/ethylene copolymer elastomer is substantially free of diene, wherein said thermoplastic propylene/ethylene copolymer elastomer is substantially devoid of heterogeneity in intramolecular composition distribution.

* * * * *